United States Patent
Tse et al.

[19]

[11] Patent Number: 5,813,162
[45] Date of Patent: Sep. 29, 1998

[54] PORTABLE HANDSFREE FISHING ROD SUPPORTING DEVICE

[76] Inventors: Steven Tse, 4Fl. 27, Lane 160, Hsin Sheng S. Rd., Sec. 1, Taipei; Meng Chin Tseng, 207, Te Fang Rd., Sec. 3, Ta Li City,Taichung Hsien, both of Taiwan

[21] Appl. No.: 784,594

[22] Filed: Jan. 21, 1997

[51] Int. Cl.$^6$ ............................................... A01K 97/10
[52] U.S. Cl. ........................... 43/21.2; 224/200; 224/242; 224/922
[58] Field of Search ............................ 43/21.2; 224/922, 224/200, 197, 242, 661, 625

[56] References Cited

U.S. PATENT DOCUMENTS

| | | | |
|---|---|---|---|
| D. 295,776 | 5/1988 | Johansen | 224/922 |
| 507,481 | 10/1893 | Brooks | 224/200 |
| 921,900 | 5/1909 | Shuster | 224/200 |
| 1,198,202 | 9/1916 | Drinkard | 224/922 |
| 2,298,694 | 10/1942 | Haislip | 224/922 |
| 2,954,909 | 10/1960 | Miller et al. | 224/200 |
| 2,995,855 | 8/1961 | Bell | 43/21.2 |
| 3,021,101 | 2/1962 | Gliebe | 224/922 |
| 4,828,152 | 5/1989 | Pepping | 43/21.2 |
| 4,836,426 | 6/1989 | Munn et al. | 224/661 |
| 5,014,891 | 5/1991 | King | 224/200 |
| 5,193,725 | 3/1993 | Radocy | 224/200 |
| 5,386,932 | 2/1995 | Gross | 224/922 |
| 5,511,336 | 4/1996 | Bishop | 224/922 |
| 5,520,312 | 5/1996 | Maddox | 224/922 |

FOREIGN PATENT DOCUMENTS

| | | | |
|---|---|---|---|
| 10333 | 7/1915 | United Kingdom | 224/922 |

*Primary Examiner*—Michael J. Carone
*Assistant Examiner*—Darren Ark
*Attorney, Agent, or Firm*—Pro-Techtor International Services

[57] ABSTRACT

A fishing rod supporting device allows a fisherperson to wear it at waist-level for hands-free support of a fishing rod. The fishing rod supporting device includes a cylindrical holder having an hollowed inside and a top open end and a bottom open end. A linked member is provided on the bottom of the cylindrical holder to selectively close and open the bottom open end of the cylindrical holder. A cushion pad having at least a pair of belts is provided for strapping the cushion pad to the body of the fisherperson. A coupler is used to connect the cylindrical holder to the cushion pad, which is capable of allowing the cylindrical holder to be rotatable within a specific angular range.

4 Claims, 7 Drawing Sheets

PORTABLE HANDSFREE FISHING ROD SUPPORTING DEVICE

BACKGROUND OF THE INVENTION

The present invention relates to fishing outfits, and more particularly, to a fishing rod supporting device that is portable and can be worn by the fisherperson at waist-level for supporting a fishing rod.

Fishing with fishing rods is a popular leisure time activity for many people. A fishing rod is usually a long, flexible rod used with a reel and line for catching fish in the water. To use a fishing rod, a fisherperson has to hold the fishing rod by hand at one end thereof. Usually, the fisherperson has to do so all time while fishing, which is quite tiring for the fisherperson. To reduce the effort required to hold the fishing rod all the time, there is a conventional device that allows the fisherperson to fix the handle of the fishing rod on the ground, allowing the fisherperson to handsfreely sit by until the fishing rod catches a fish. A drawback to this conventional device, however, is that it should be fixed on a flat ground. As a result, the conventional device is not suitable for use in rugged fishing places like seashores or muddy lakesides.

Furthermore, when the fishing rod catches a fish in the water, the usual procedure to get the fish ashore is to first wind up the reel on the fishing rod and then, until the fish is near the shore, use a net to take the fish up to the shore.

In the reel wind-up step, the fisherperson has to use one hand to hold the handle of the fishing rod and the other to wind up the line to draw the fish in the water toward the shore. In case the fish being caught is a very big one, the fisherperson usually has to apply great force both on the fishing rod and on the reel so as to struggle against the escaping effort by the big fish. However, according to fundamental mechanics, holding one hand at the handle, which is located at the extreme end of the fishing rod, allows the fisherperson minimum capability to apply force on the fishing rod. Many times the fisherperson has to abandon the big fish being caught simply because he/she is unable to pull the big fish ashore. If the handle of the fishing rod can be pivotally fixed at a certain point, for example, in the waist, the fisherperson can then hold the fishing rod at a distance from the handle, thereby allowing the fisherperson to more fully utilize his/her strength on the fishing rod to hold it more firmly against the big fish.

In the netting step, the fisherperson has to use at least one of his/her hands to hold a net to take the fish up to the shore. If there are other fisherpersons who can help netting the fish, there would be no problem. But this is not usually the case since the fisherperson may be alone doing the fishing. In this case, the fisherperson has to use at least one of his/her hands to hold a net to take the fish to the shore. There is no problem to this action if the fish being caught is a small one, but in the event that the fish is a very big one, the use of only one hand to hold the fishing rod may let the fish escape farther away and the struggle has to be done again. There exists therefore a device that can help the fisherperson hold the fishing rod at this time so that the fisherperson can free his/her two hands from the fishing rod so as to conveniently and effortlessly use a net to net the fish ashore.

Still, in carrying fishing outfits on the go, the lengthy fishing rod is usually difficult to carry and a customary way to carry the fishing rod on the go is simply by taking it in hand, which is a very inconvenient practice. There exists therefore a device that allows the fisherperson to carry the fishing rod without having to hold it in hand.

SUMMARY OF THE INVENTION

It is therefore a primary objective of the present invention to provide a fishing rod supporting device that allows the fisherperson to use the fishing rod without having to continuously hold it by hand.

It is another objective of the present invention to provide a fishing rod supporting device that allows the fisherperson to use his/her two hands to net a fish caught by the fishing rod.

It is still another objective of the present invention to provide a fishing rod supporting device that allows the fisherperson to carry the fishing rod on the go without having to use his/her hands.

In accordance with the foregoing and other objectives of the present invention, a novel fishing rod supporting device is provided. The fishing rod supporting device comprises (a) a cylindrical holder having an hollowed inside and a top open end and a bottom open end; (b) a chained member, provided on the bottom of the cylindrical holder, for selectively closing and opening the bottom open end of the cylindrical holder; (c) a cushion pad having at least a pair of belts for strapping the cushion pad to the body of the fisherperson; and (d) a coupler for connecting the cylindrical holder to the cushion pad, the coupler being capable of allowing the cylindrical holder to be rotatable within a specific angular range.

BRIEF DESCRIPTION OF DRAWINGS

The present invention can be more fully understood by reading the subsequent detailed description of the preferred embodiments thereof with references made to the accompanying drawings, wherein.

DETAILED DESCRIPTION OF PREFERRED EMBODIMENT

Figure 1:
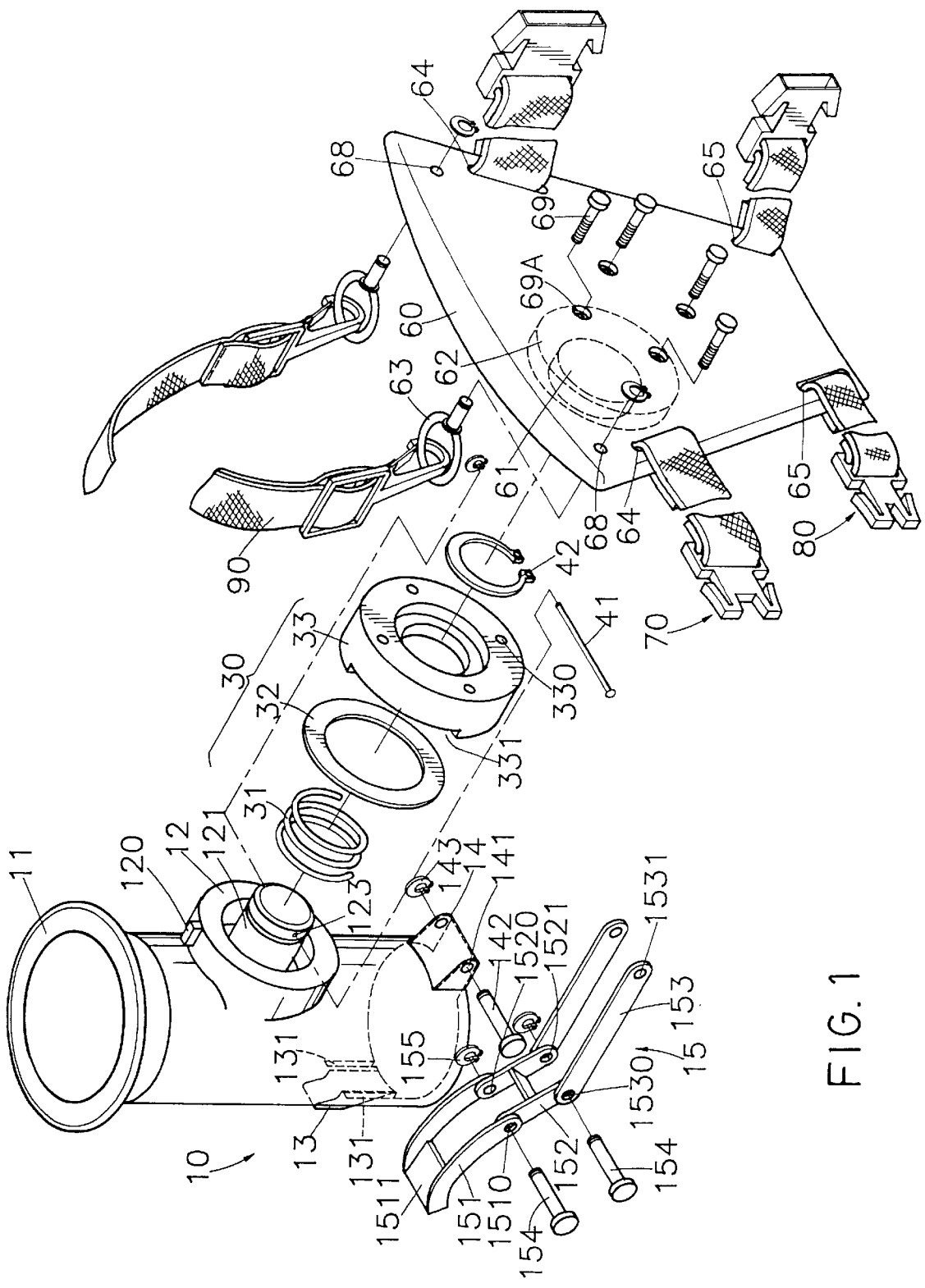
FIG. 1 shows an exploded perspective view of a fishing rod supporting device according to the present invention.
Figure 2:
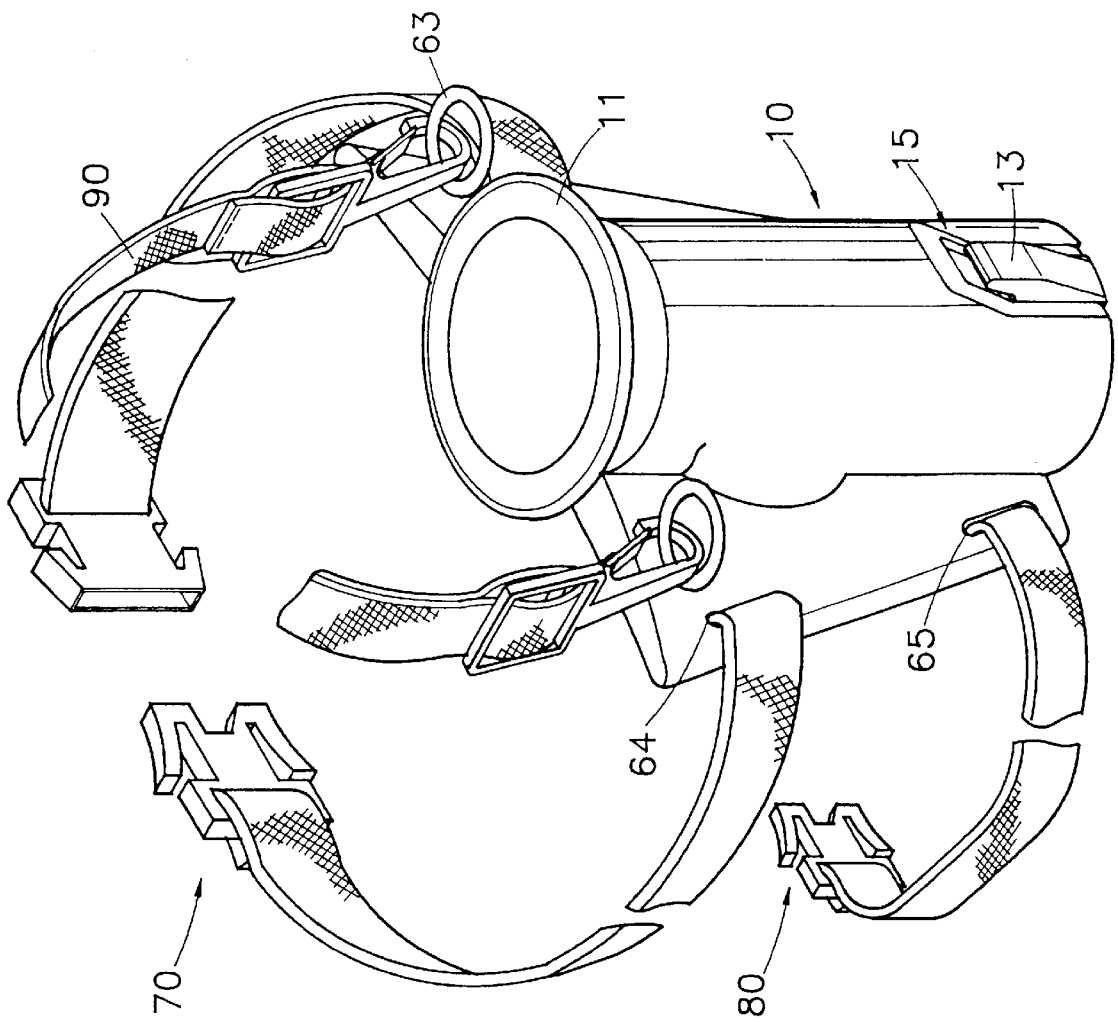
FIG. 2 shows a perspective view of the fishing rod supporting device of FIG. 1 after being assembled.
Figure 3:
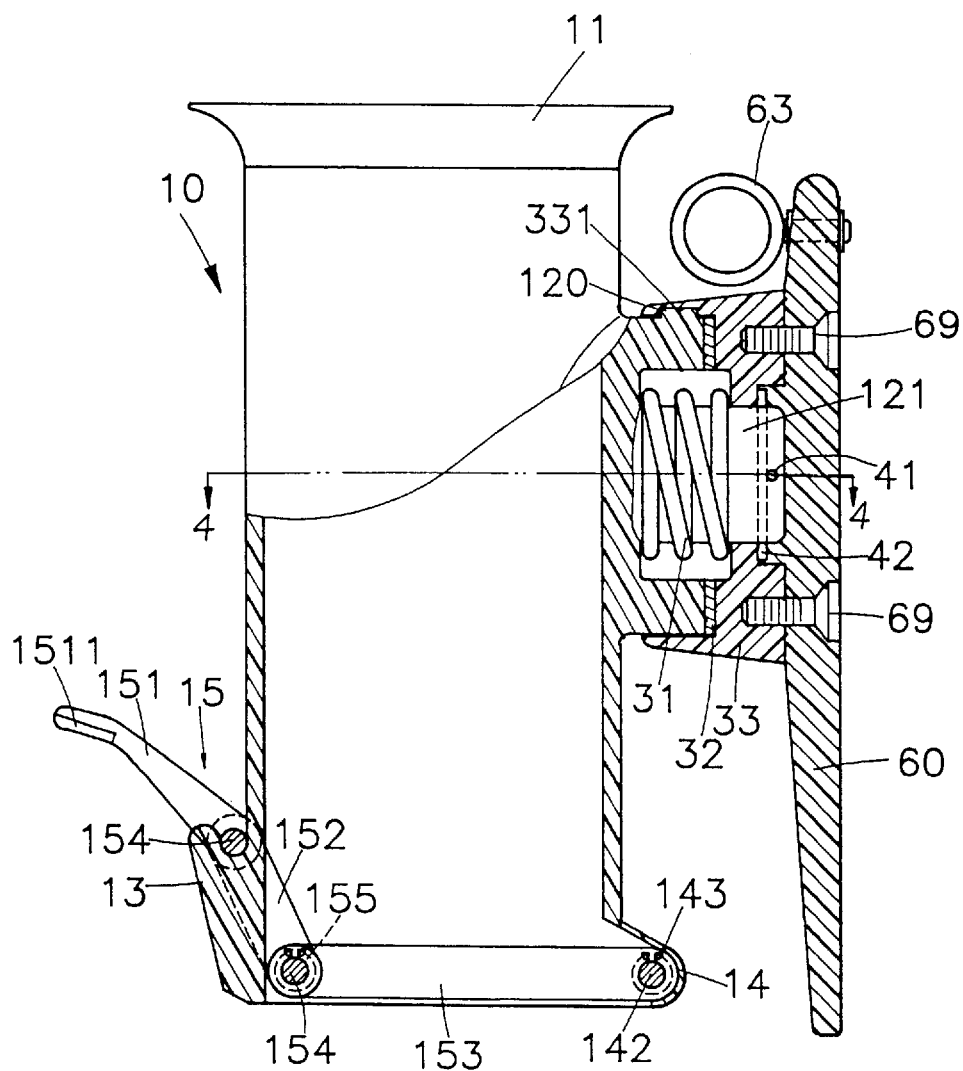
FIG. 3 shows a longitudinal sectional view of the fishing rod supporting device of FIG. 2.
Figure 4:
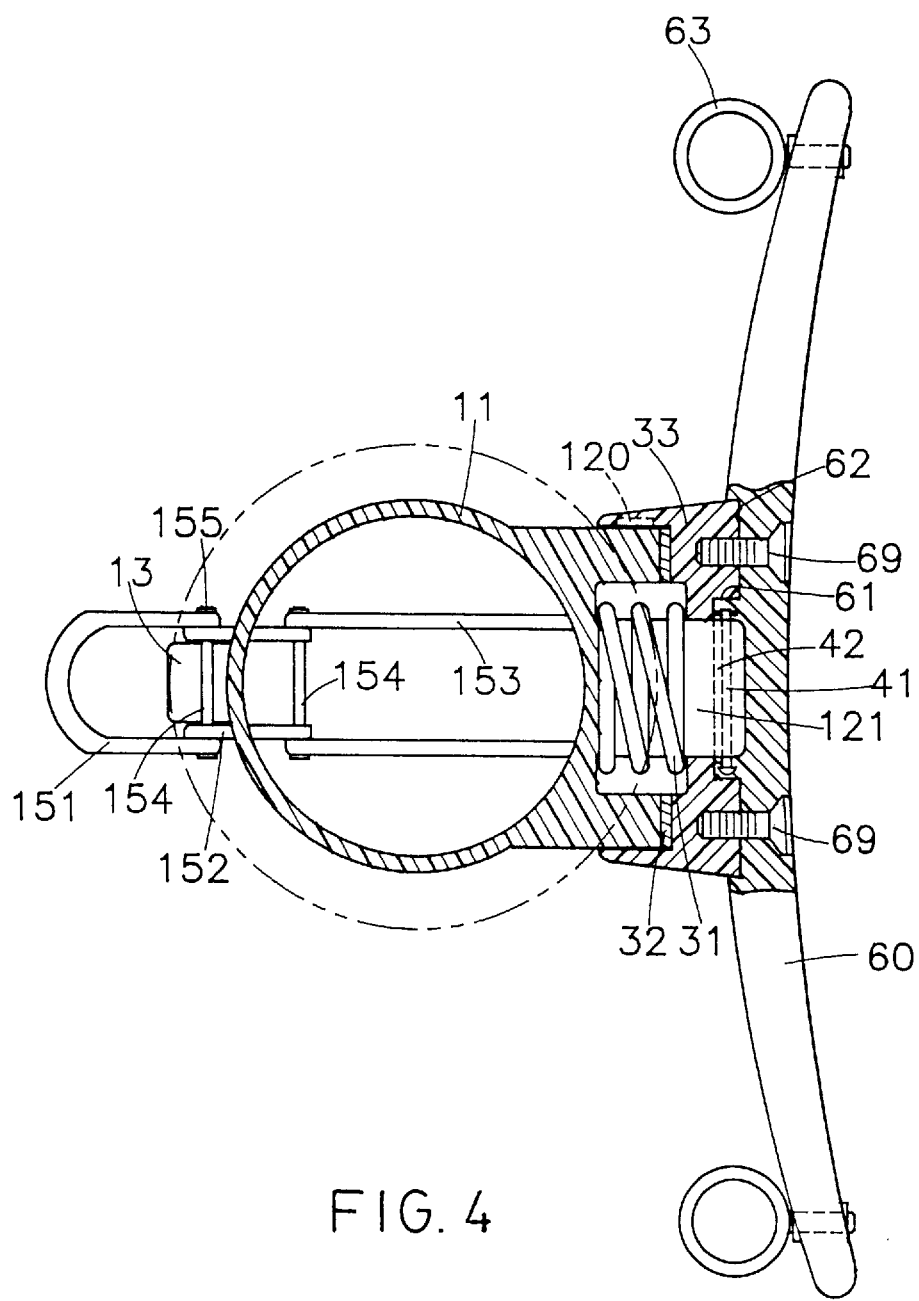
FIG. 4 shows a traversal sectional view of the fishing rod supporting device of FIG. 2.

Referring concurrently to FIGS. 1 through 5, there is shown a preferred embodiment of a portable handsfree fishing rod supporting device 10 according to the present invention. As shown in FIG. 1, the fishing rod supporting device 10 according to the present invention includes essentially a cylindrical holder 11 for holding a fishing rod, a cushion pad 60 for mounting the cylindrical holder 11, a coupler 30 for coupling the cylindrical holder 11 to the cushion pad 60, and three pairs of fastening belts, a pair of waist belts 70, a pair of hip belts 80, and a pair of shoulder belts 90 for fastening the fishing rod supporting device 10 on the fisherperson.

The cushion pad 60 is a slightly curved piece of a durable material such as plastic or leather layered with a soft material (not shown) on the side that is to be attached to the waist of the fisherperson. The shoulder belts 90 are connected to the cushion pad 60 by means of metal rings 63, and the waist belts 70 and hip belts 80 are connected to the cushion pad 60 by means of knotting through slots 64, 65 respectively on the cushion pad 60. The waist belts 70, hip belts 80, and shoulder belts 90 are all conventional means for fastening an object to the waist, hip, and shoulder of a person, so that detailed description about the structure thereof will not be given here in this specification.

The cylindrical holder 11 is a lengthy cylindrical container with a hollowed inside and two open ends. The periphery of the cylindrical holder 11 is formed with a circular protrusion 12 having a hollowed center provided with an axle 121 on which an engaging hole 123 in the transverse direction is formed. Opposite to the circular protrusion 12 on the cylindrical holder 11 near the bottom is there formed with a locking member 13. A pair of slots 131 are respectively provided on the sides of the locking member 13. An ear 14 is provided on the rim of the bottom of the cylindrical holder 11. A through hole 141 is provided on the front end of the ear 14. A linked member 15 is mounted on the bottom of the cylindrical holder 11 by means of the locking member 13 and the ear 14.

The linked member 15 includes three links, a top link 151, an intermediate link 152, and a bottom link 153. The top link 151 has its front end provided with a curved handle 1511 and its rear end provided with a connecting hole 1510; the intermediate link 152 is an H-shaped piece having both ends provided with connecting holes 1520, 1521; and the bottom link 153 has both ends provided with connecting holes 1530, 1531. The intermediate link 152 is linked to the top link 151 by means of a pin 154 and a snap-ring 155 coupling through the connecting holes 1510 and 1520, and the bottom link 153 is linked to the intermediate link 152 by means of another pin 154 and snap-ring 155 coupling through the connecting holes 1521, 1530. Further, the bottom link 153 is linked to the cylindrical holder 11 by means of a pin 142 and a snap-ring 143 coupling through the connecting holes 1531 on the bottom link 153 and the connecting hole 141 on the ear 14 on the bottom of the cylindrical holder 11. The handle 1511 on the front end of the top link 151 is normally put in engagement with the locking member 13 on the cylindrical holder 11, with the two parallel arms of the top link 151 received by the slots 131 beside the locking member 13. With the linked member 15 in engagement with the locking member 13, the bottom link 153 thereon covers the bottom open end of the cylindrical holder 11, acting as a support that allows the cylindrical holder 11 to receive the handle of a fishing rod therein.

The cylindrical holder 11 is connected to the cushion pad 60 via the coupler 30 which includes a spring 31, a washer 32, and a ring-shaped member 33. The ring-shaped member 33 is fastened to the cushion pad 60 by means of four threaded holes 330 provided on its front face and four corresponding screws 69 coupled through holes 69A provided on the cushion pad 60. On the other side, the coupler 30 is connected to the cylindrical holder 11 by means of a pin 41 and a snap-ring 42 coupled with each other on the axle 121, which allows the coupler 30 to be rotatable about the axle 121. In accordance with the preferred embodiment of the present invention, the rotating range of the coupler 30 is restricted within 90 degrees in angle by the provision of a stopper 120 and a 90-degree radial cutaway portion 331 on the rear face of the ring-shaped member 33. The 90-degree rotating range allows a fishing rod held in the cylindrical holder 11 to be adjusted between a near upright position 15 degrees to the back and a near leveled position 15 degrees relative to the horizontal. The disclosed rotating range here is a matter of design choice for convenient use by the fisherperson and not intended to be a limitation to the scope of the present invention. Other rotating ranges are possible as long as they allows convenient use to the fisherperson.

The waist belts 70, hip belts 80, and shoulder belts 90 fastened on the cushion pad 60 allow the fisherperson to strap the fishing rod supporting device 10 to various parts of the body. The fisherperson needs not to use all these three kinds of belts 70, 80, 90 at the same time. For instance, on the go only the shoulder belts 90 are necessary, but when fishing large fishes on the seashore, it is recommended that the fisherperson straps all the three kinds of belts 70, 80, 90 to his/her body so as to provide a firm and secure support for the fishing rod when it hooks a large fish.

Figure 5:
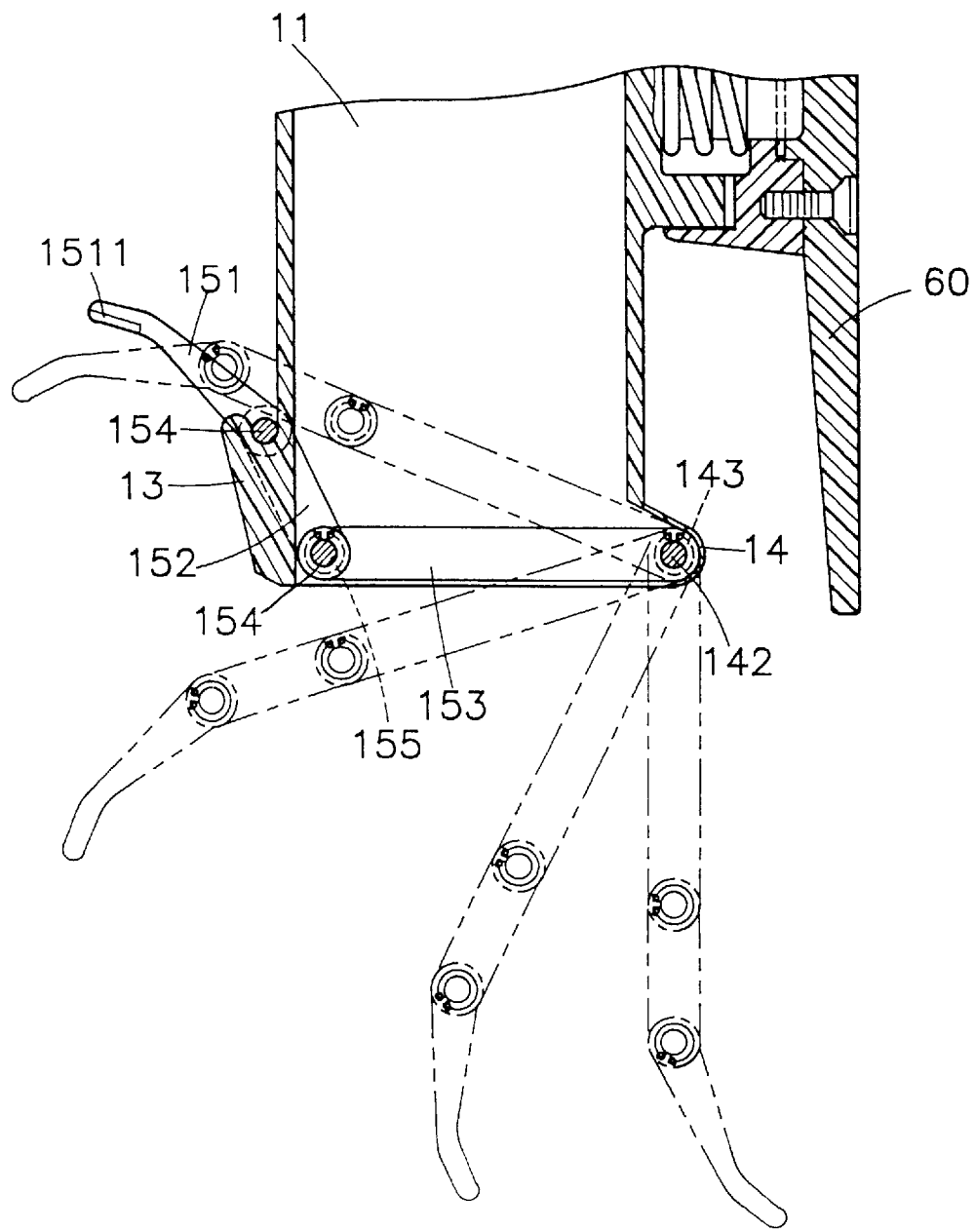
FIG. 5 is a schematic diagram used to depict the operation of a cylindrical holder employed in the fishing rod supporting device.
Figure 6A:
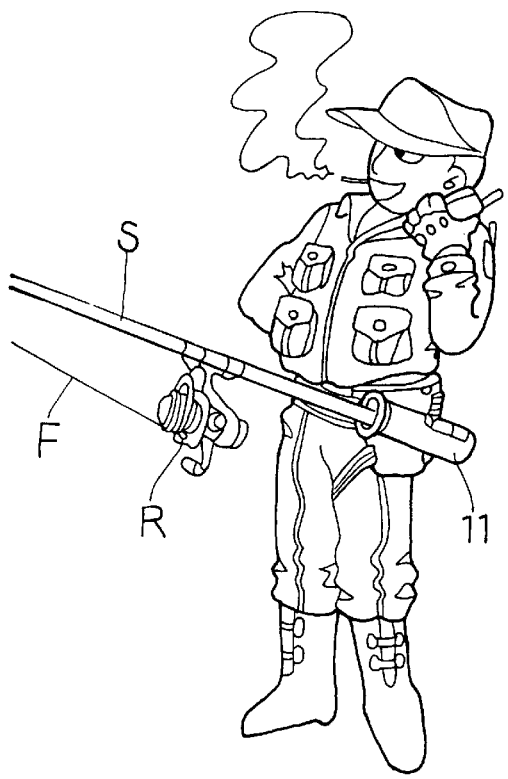
FIGS. 6A–6C are sketches used to illustrate three practical applications of the fishing rod supporting device for a fisherperson.
Figure 6B:
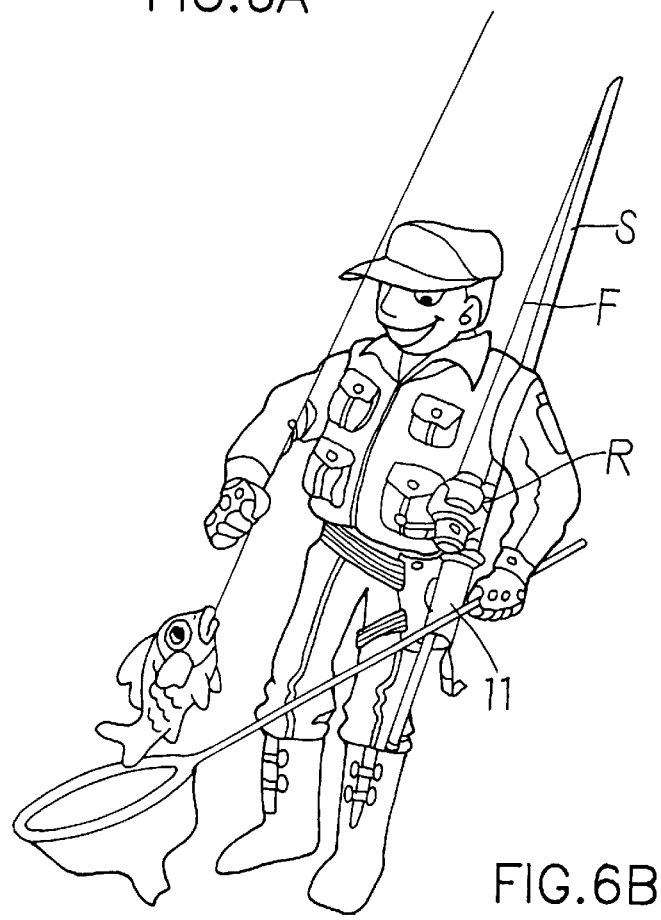
Figure 6C:
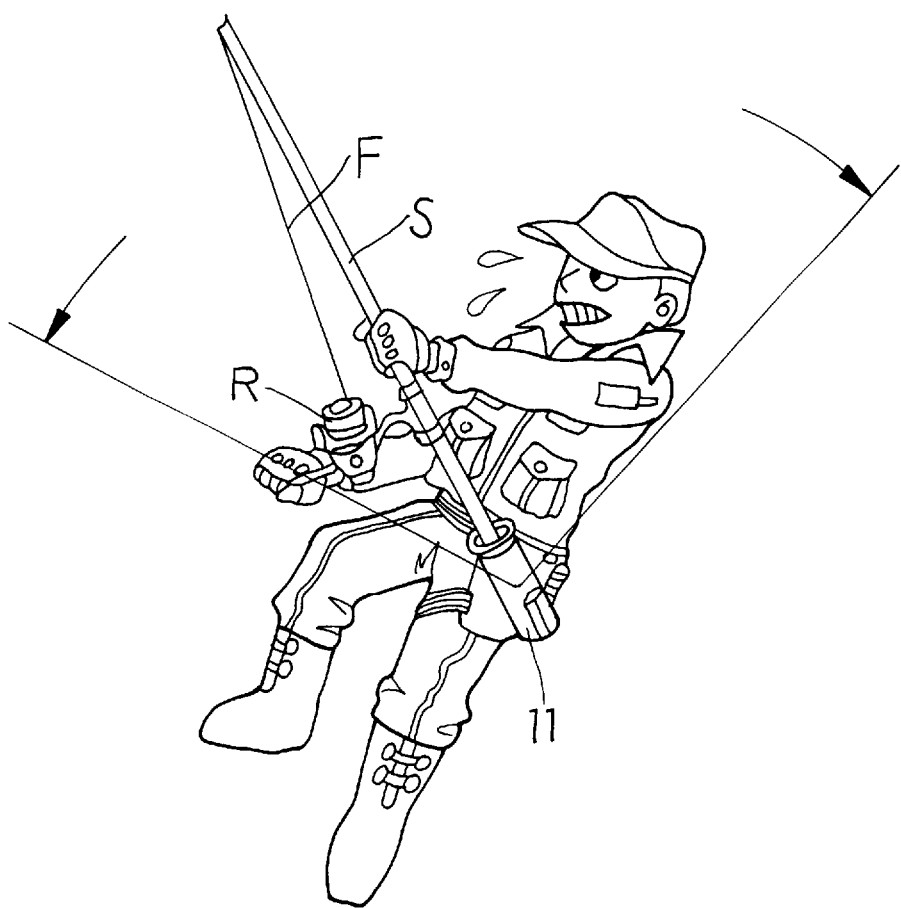

Referring to FIGS. 6A–6C, there are illustrated three practical instances of using the fishing rod supporting device according to the present invention by a fisherperson. FIG. 6A illustrates an instance of using the fishing rod supporting device according to the present invention by a fisherperson to hold a fishing rod S. The cylindrical holder 11 in this instance is inclined forward with an elevation angle of 15 degrees. The handle of the fishing rod S is inserted in the cylindrical holder 11 (at this time the linked member 15 is in engagement with the locking member 13 so as to allow the bottom link 153 thereon to act as a support on the bottom open end of the cylindrical holder 11 as shown in FIG. 5). As illustrated, this allows the fisherperson to let his two hands free while using the fishing rod S.

As further illustrated in FIG. 6C, when the fishing rod S catches a fish, the fisherperson can use one hand to hold the rod part of the fishing rod S and the other to wind up the reel R to pull the fish from the water. In this instance, the cylindrical holder 11 acts as a pivot point that allows the fisherperson to raise the other end of the fishing rod S to elevation angles within the 90-degree range.

As further illustrated in FIG. 6B, when the fish being caught by the fishing rod is pulled near the shore of the water, the fisherperson can disengage the linked member 15 from the locking member 13 on the cylindrical holder 11 so as to allow the handle of the fishing rod S to penetrate through the hollowed inside of the cylindrical holder 11. This would allow the fisherperson to easily bear the fishing rod in a nearly upright manner on one side of his body. At this time, the fisherperson can use both of his hands to net the fish ashore. The fish is thus caught by the fisherperson. Whether in fishing or on the go, the fishing rod supporting device according to the present invention allows the fisherperson to let his/her hand free whenever necessary, allowing the fishing to be more pleasurable.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A fishing rod supporting device for use by a fisherperson for hands-free operation of a fishing rod comprising:
   (a) a cylindrical holder having a hollowed interior and a top open end and a bottom open end, a bottom rim of said bottom open end includes a locking member and an ear with a connecting hole;

(b) a linked member is provided on said bottom rim of said cylindrical holder to selectively close and open said open bottom end of said cylindrical holder, said linked member comprises
- (i) a top link having a first end and a second end, said first end of said top link includes a handle means,
- (ii) an intermediate link having a first end and a second end, said first end of said intermediate link is pivotally linked with said second end of said top link, and
- (iii) a bottom link having a first end and a second end, said first end of said bottom link is pivotally linked to said second end of said intermediate link, said second end of said bottom link is pivotally connected to said ear on said cylindrical holder, and wherein said handle means selectively engages said locking member on said cylindrical holder so as to allow said intermediate link to act as a support on said bottom open end of said cylindrical holder, (c) a cushion pad including at least a pair of belts to strap said cushion pad to a body of the fisherperson, and (d) a coupler to connect said cylindrical holder to said cushion pad, said coupler allows said cylindrical holder to rotate within a given angular range.

2. The fishing rod supporting device as claimed in claim 1 wherein:

said coupler comprises a ring-shaped member coupled to an axle by means of a pin and a securing means, said pin passes through a connecting hole in said axle, and said coupler is affixed to said cushion pad.

3. The fishing rod supporting device as claimed in claim 1 wherein:

said angular range is ninety degrees.

4. The fishing rod supporting device as claimed in claim 1 wherein:

said cushion pad further includes a pair of waist belts to strap said fishing rod supporting device to a waist of the fisherperson, said cushion pad further includes a pair of hip belts to strap said fishing rod supporting device to a hip of the fisherperson.

* * * * *